United States Patent [19]

Todeschini

[11] 4,132,278
[45] Jan. 2, 1979

[54] HYDROSTATIC TRANSMISSIONS

[75] Inventor: Eugenio Todeschini, Latina, Italy

[73] Assignee: Massey-Ferguson Services N.V., Curacao, Netherlands Antilles

[21] Appl. No.: 797,662

[22] Filed: May 17, 1977

[30] Foreign Application Priority Data

May 20, 1976 [GB] United Kingdom ............... 20824/76

[51] Int. Cl.² ............................................ B62D 11/06
[52] U.S. Cl. ............................. 180/6.48; 60/DIG. 10
[58] Field of Search ............................... 180/6.7, 6.48; 60/DIG. 10, 486, 484; 248/2, 19

[56] References Cited

U.S. PATENT DOCUMENTS

| 2,036,432 | 4/1936 | Ruediger | 180/6.7 X |
| 3,279,172 | 10/1966 | Kudo | 60/484 |
| 3,513,654 | 5/1970 | Engel | 60/485 |

Primary Examiner—Joseph F. Peters, Jr.
Assistant Examiner—R. Schrecengost
Attorney, Agent, or Firm—William R. Nolte

[57] ABSTRACT

In a crawler vehicle having a rear housing or frame: a pair of hydrostatic transmission pumps located on the center line of the crawler are connected to a pair of motors arranged along the transverse axis by a manifold to form a cruciform unit. The cruciform unit is mounted in the rear housing.

2 Claims, 5 Drawing Figures

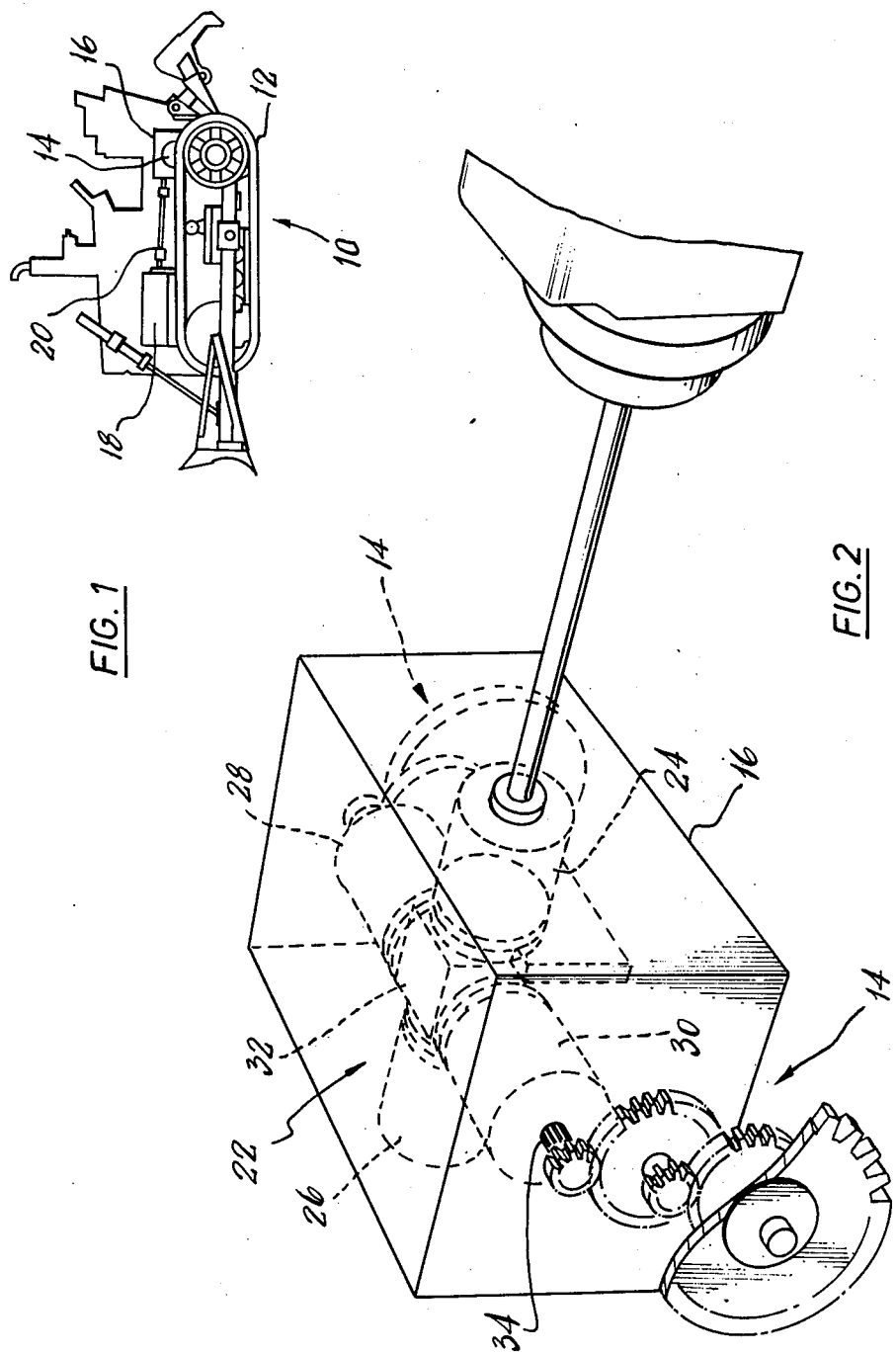

HYDROSTATIC TRANSMISSIONS

This invention relates to hydrostatic transmissions and in particular to such transmissions installed in crawler vehicles.

It is known to provide a crawler vehicle with a pair of pump and motor units, each unit transmitting drive to one track. In this way it is possible to propel each track at different speeds to permit the vehicle to make a turn of any radius.

Previous proposals have placed the pumps adjacent the engine and the motors adjacent the drive for the track. Flexible hoses have been used to interconnect the pumps and motors.

Such arrangements however have been susceptible to damage because of the vulnerability of pipes and the internal components of the pumps and motors. Further, they have not always made optimum use of available space and have not always been readily serviceable.

It is an object of the present invention to obviate or mitigate the above disadvantages.

According to the present invention there is provided a crawler vehicle having a pair of ground engaging tracks, drive means drivingly engaging said tracks to propel said vehicle and supported on a housing, a hydrostatic transmission mounted within said housing to transmit drive from an engine to said drive means, said transmission comprising a manifold, a pair of pumps mounted on a first pair of opposite faces of said manifold and a pair of motors, mounted on a second pair of opposite faces of said manifold, said manifold including passage means interconnecting each pump with its respective motor.

Preferably said pumps and motors are arranged in a cruciform configuration around said manifold.

Preferably also said manifold is retained in said housing by means of a pair of supports each having a circular aperture to encompass a portion of said manifold and being split across a diameter into two parts to allow assembly of said transmission into said housing, said parts being connectable by bolts. An embodiment of the invention will now be described by way of example only with reference to the accompanying drawings in which:

FIG. 1 is a side view of a crawler vehicle;

FIG. 2 is a perspective view showing diagrammatically the arrangement of part of the crawler of FIG. 1;

Figure 3:
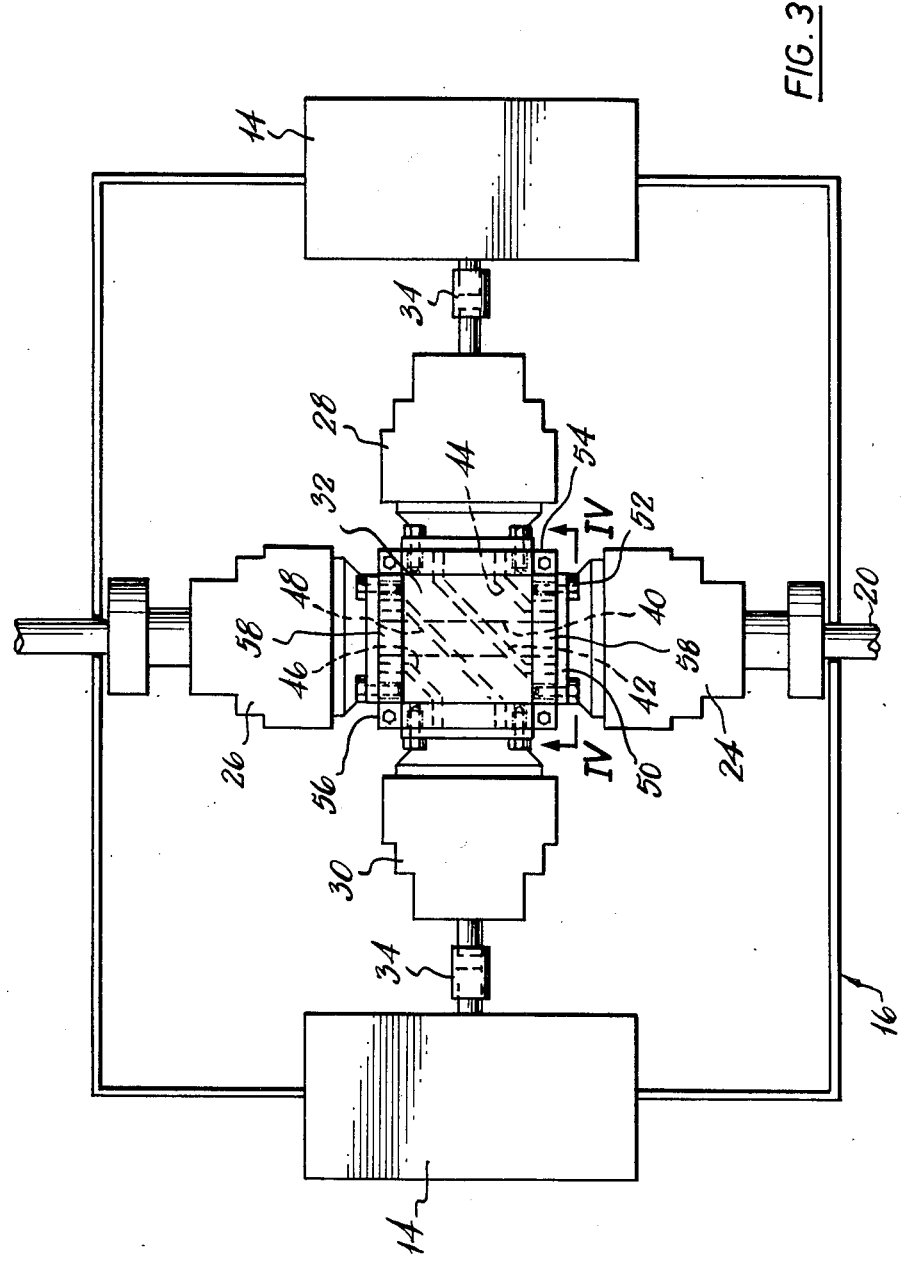
FIG. 3 is a plan view of the embodiment shown in FIG. 2.
Figure 4:
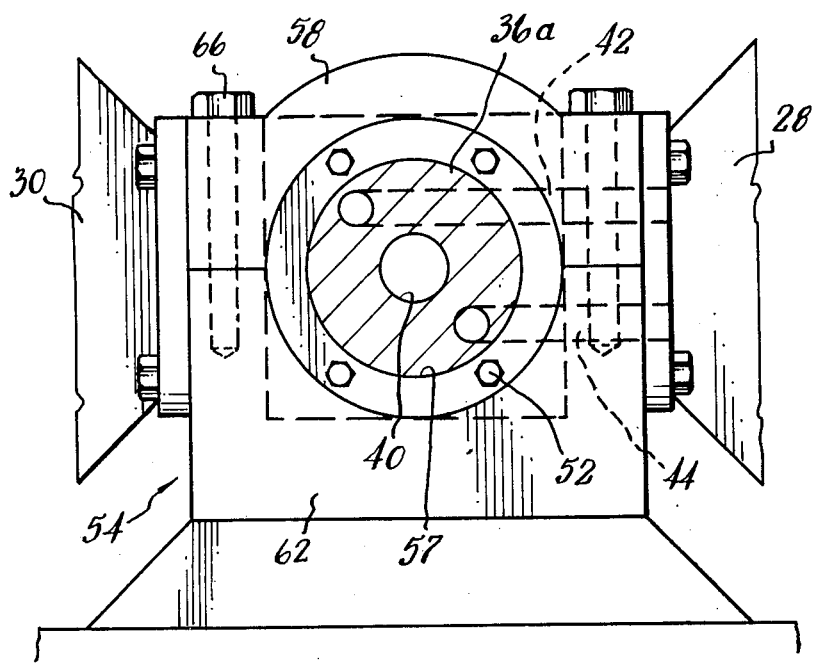
FIG. 4 is a view on the line IV to IV of FIG. 3.
Figure 5:
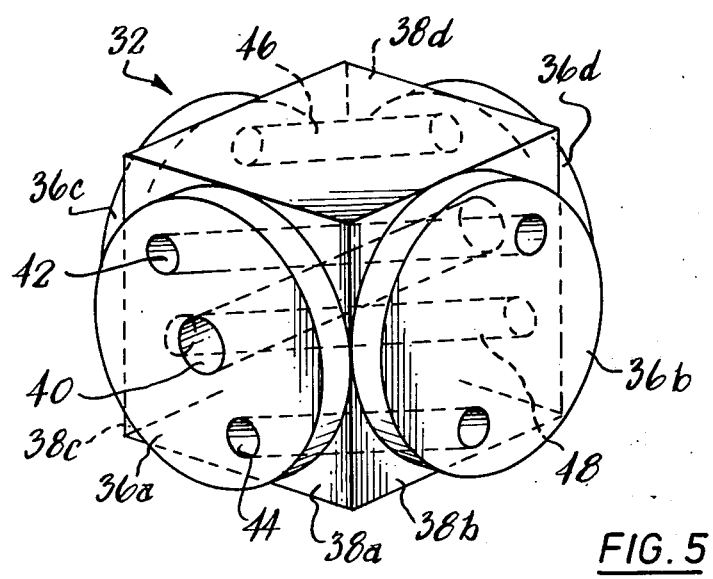

FIG. 5 is a detail perspective of the manifold shown in the embodiment of FIGS. 2 to 5. Referring now to FIG. 1 a crawler vehicle 10 has a pair of tracks 12 each of which is driven by reduction gearing mounted on a rear housing 16. An engine 18 transmits drive by way of a drive shaft 20 to a transmission 22 located within the housing 16 as can best be seen in FIG. 2.

the transmission 22 comprises a pair of pumps 24, 26 and a pair of motors 28, 30. The pumps 24, 26 and motors 28, 30 are interconnected by a manifold 32.

The pumps 24, 26 are driven by the drive shaft 20 which passes through both pumps and the manifold 32 and provides a power take off shaft at the rear of the housing 16.

The motors 28, 30 drive the reduction gearing 14 by means of splined adapters 34.

As can best be seen in FIG. 5 the manifold 32 is generally cuboid with a circular projection 36 *a b c d* on four faces 38 *a b c d*. A central bore 40 accommodates the drive shaft 20. Four passages 42, 44, 46, 48 are formed within the manifold 32, the passages 42, 44 interconnecting the faces 36a and 36b and the passages 46, 48 interconnecting the faces 36c and 36d.

The pump 24 has a flange 50 by which it is mounted on the face 36a of the manifold 32 and secured by bolts 52. Similarly the pump 26 and motors 28, 30 are mounted on faces 36d, 36b and 36c respectively.

The pumps 24, 26 and motors 28, 30 are conventional swashplate units, the pumps being variable and reversible and the motors optionally variable.

Each pump and motor is of conventional construction and as such has a pair of fluid ducts which may act either as delivery or return duct depending on the condition of the pumps. The details of the pumps and motors form no part of the present invention and will not be discussed further.

The ducts associated with the pump 24 are hydraulically connected by way of the passages 42, 44 to the ducts of the motor 28 so that delivery of fluid by the pump 24 will cause rotation of the motor 28 in an appropriate direction.

Similarly the pump 26 is hydraulically connected by passages 46, 48 to the motor 30.

The transmission 22 is supported in the housing 16 on a pair of bearers 54, 56 which are provided with a circular aperture 58. Each bearer 54, 56 is split across the horizontal diameter to form a cap portion 58, and a support portion 62. The cap portion 58, is connected to the support portion 62, by bolts 66. The bearers 54, 56 encompass the circular projections 36a, 36d on the manifold 32 to securely locate the transmission 22 within the housing 16. If desirable complementary spigots or flats may be provided on the bearers and manifold to additionally locate the transmission.

The pumps 24, 25 may be assembled on the manifold 32 prior to location within the housing 16. The assembly may then be lowered onto the support portions 62, the caps 58, bolted in place and the splined adapters 34 positioned to connect the motors 28, 30 with the reduction gearing 14.

The transmission 22 is thus easily assembled and readily serviceable.

The housing 16 may conventionally be used as a sump for fluid which assists in cooling of the pumps and motors. The use of the manifold 32 obviates the need for flexible hoses. If necessary valve blocks may be located within the manifold 32 to connect passages 42 to 48 to each other or to the sump.

The use of the bearers 54, 56 ensures that the joints between pumps, motors and the manifold are not stressed, the splined adapters 34 allowing slight axial or translational movement of the transmission within the housing.

What we claim is:

1. A crawler vehicle having a pair of ground engaging tracks, a housing, drive means supported on said housing and drivingly engaging said tracks to propel the vehicle, a hydrostatic transmission mounted within said housing to transmit drive from an engine to said drive means, said transmission comprising a manifold, a pair of pumps mounted on a first pair of opposite faces of said manifold and a pair of motors, mounted on a second pair of opposite faces of said manifold, said manifold including passage means interconnecting each pump with its respective motor, a pair of supports each having an aperture to encompass at least a portion of said manifold and being split into two parts to allow assembly of said transmission into said housing, one of said parts being attached to the housing and the other part being connectable by fastener means to said one part to support said manifold which in turn supports the transmission in said housing.

2. A hydrostatic transmission mounted within a vehicle drive housing to transmit drive force from an engine to the vehicle drive means including a manifold, a pair of pumps mounted on a first pair of opposite faces of the manifold and a pair of motors mounted on a second pair of opposite faces of the manifold wherein the manifold has passage means interconnecting each pump with its respective motor, the first pair of manifold faces being centered on an axis passing through the center of the pumps, the improvement comprising: a through shaft passing through a bore in said manifold and drivingly connecting the pair of pumps, said through shaft being on the axis of said first pair of manifold faces.

* * * * *